United States Patent
Marques de Lima

(10) Patent No.: US 11,091,721 B2
(45) Date of Patent: Aug. 17, 2021

(54) ENZYMATIC DEGUMMING OF UNREFINED TRIGLYCERIDE OIL

(71) Applicant: PURAC BIOCHEM B.V., Gorinchem (NL)

(72) Inventor: Danilo Marques de Lima, Sao Paulo (BR)

(73) Assignee: PURAC BIOCHEM B.V., Gorinchem (NL)

( * ) Notice: Subject to any disclaimer, the term of this patent is extended or adjusted under 35 U.S.C. 154(b) by 5 days.

(21) Appl. No.: 16/593,910

(22) Filed: Oct. 4, 2019

(65) Prior Publication Data
US 2020/0032161 A1 Jan. 30, 2020

Related U.S. Application Data

(63) Continuation of application No. PCT/EP2017/084131, filed on Dec. 21, 2017.

(30) Foreign Application Priority Data

Apr. 6, 2017 (WO) ................ PCT/NL2017/050219

(51) Int. Cl.
*C11B 3/00* (2006.01)
*A23D 9/02* (2006.01)
*C11B 3/04* (2006.01)

(52) U.S. Cl.
CPC ............... *C11B 3/003* (2013.01); *A23D 9/02* (2013.01); *C11B 3/001* (2013.01); *C11B 3/04* (2013.01)

(58) Field of Classification Search
CPC .......... C11B 3/001; C11B 3/003; C11B 3/04; A23D 9/02
USPC ........................................................ 435/271
See application file for complete search history.

(56) References Cited

U.S. PATENT DOCUMENTS

| 4,049,686 A | 9/1977 | Ringers et al. |
| 5,264,367 A | 11/1993 | Aalrust et al. |
| 6,001,640 A | 12/1999 | Loeffler et al. |
| 8,956,853 B2 | 2/2015 | Dayton et al. |

FOREIGN PATENT DOCUMENTS

| EP | 2053118 A1 * | 4/2009 | ..... C12Y 301/04004 |
| EP | 2053118 A1 | 4/2009 | |
| WO | WO 2005063950 A1 | 7/2005 | |

OTHER PUBLICATIONS

Dijkstra, Albert J.; "Enzymatic degumming"; European Journal of Lipid Science and Technology; vol. 112, No. 11; pp. 1178-1189; Nov. 1, 2010.
International Search Report & Written Opinion issued in International Application No. PCT/NL2017/050219, dated Jul. 12, 2017.
International Search Report & Written Opinion issued in International Application No. PCT/EP2017/084131, dated Mar. 26, 2018.

* cited by examiner

*Primary Examiner* — Deborah D Carr
(74) *Attorney, Agent, or Firm* — Foley & Lardner LLP

(57) ABSTRACT

The present invention provides a process for the enzymatic degumming of unrefined triglyceride oils, said process comprising:
a) providing an unrefined triglyceride oil having a phosphorus content of at least 100 mg per kg of unrefined triglyceride oil;
b) combining the unrefined triglyceride oil with water, lactic acid and enzyme to produce an oil-and-water emulsion, said enzyme being selected from phospholipase, lipid acyltransferase and combinations thereof;
c) keeping the emulsion at a temperature of 20-90° C. for at least 10 minutes; and
d) separating degummed triglyceride oil from the emulsion.
This enzymatic degumming process is extremely effective in removing phospholipids, including non-hydratable phospholipids (NHP), from crude and other unrefined vegetable oils.

16 Claims, No Drawings

ENZYMATIC DEGUMMING OF UNREFINED TRIGLYCERIDE OIL

CROSS-REFERENCE TO RELATED APPLICATIONS

The present application is a bypass continuation of International Application No. PCT/EP2017/084131 filed Dec. 21, 2017, which claims priority to International Application No. PCT/NL2017/050219 filed Apr. 6, 2017, the contents of which are hereby incorporated by reference in their entirety.

TECHNICAL FIELD OF THE INVENTION

The invention relates to a process for enzymatic degumming of unrefined triglyceride oil, said process comprising:

a) providing an unrefined triglyceride oil having a phosphorus content of at least 100 mg per kg of unrefined triglyceride oil;

b) combining the unrefined triglyceride oil with water, lactic acid and enzyme to produce an oil-and-water emulsion, said enzyme being selected from phospholipase, lipid acyltransferase and combinations thereof;

c) keeping the emulsion at a temperature of 20-90° C. for at least 10 minutes; and d) separating degummed triglyceride oil from the emulsion.

The degumming process of the present invention offers the advantage that it is highly effective in removing phospholipids (gums) from crude and other unrefined triglyceride oils.

BACKGROUND OF THE INVENTION

Crude vegetable oils, and especially those obtained by solvent extraction, tend to be unpalatable and, therefore, need to be purified before they can be incorporated in food products and/or sold to consumers. The various steps involved in this purification are referred to as "refining".

A distinction is made between chemical and physical refining. Chemical refining comprises the following process steps: 1. degumming, 2. neutralization, 3. bleaching, 4. deodorization. In the degumming step, phospholipids (gums) and metal ions are removed from the crude oil. The neutralization step serves to extract the free fatty acids. In the bleaching step, pigments, further metal ions and residual phospholipids are removed. The final refining step, i.e. deodorization, is a steam distillation, in which volatile compounds that adversely affect the odor and taste of the oil are removed. In physical refining, no neutralization step is employed and free fatty acids are removed in the deodorisation step at the end of the refining process.

Both chemical refining and physical refining start with the degumming of the crude triglyceride oil.

The most commonly used degumming processes in the industry are water degumming, acid degumming, caustic refining and enzymatic degumming. The degumming step is responsible for most of the oil loss that occurs during the refining of vegetable oils.

The prime aim of the degumming process is to remove phospholipids. Phospholipids (or phosphatides) are a class of lipids that contain a glycerol group that is esterified with phosphoric acid and two fatty acids. The phosphate group can carry an organic residue such as choline (phosphatidylcholine), ethanolamine (phosphatidylethanolamine) or inositol (phosphatidylinositol).

Degumming exploits the affinity of phospholipids for water by converting them to hydrated gums. The hydrated gums are insoluble in oil and can be removed by centrifugation. The rate of hydration varies substantially for the different phospholipids. Phosphatidic acid and the salts of phosphatidic acid are commonly known as "Non Hydratable Phospholipids" or NHPs.

The phospholipid content of triglyceride oils is commonly measured as "phosphorous content" in parts per million. Soybean oil typically has a phosphorous content of 400-1200 ppm. Canola oil and sunflower oil typically have phosphorous contents of 200-900 ppm and 300-700 ppm, respectively.

The use of enzymes for the removal of gums from crude vegetable oils is fairly recent. The first industrial enzymatic degumming process was launched in 1992. Examples of enzymes that have been used in enzymatic degumming of crude triglyceride oils include:

phospholipase A1 (e.g. Quara® LowP and Lecitase® Ultra, ex Novozymes)

phospholipase A2 (e.g. Rohalase PL-Xtra® and Rohalase MPL®, ex AB Enzymes LysoMax®, ex Danisco)

phospholipase C (e.g Purifine®, ex DSM)

lipid acyltransferase (LysoMax®, ex Danisco)

Phospholipase A1, phospholipase A2 and lipid acyltransferase catalyse the removal of a fatty acid from phospholipids and thereby cause a lysophospholipid to be formed. This lysophospholipid is more hydrophilic than its non-hydrolysed precursor and can be removed more easily from the triglyceride oil.

Phospholipase C catalyses the hydrolysis of phospholipids such as phosphatidylcholine and phosphatidylethanolamine, forming diacylglycerol and a water-soluble phosphate-bearing ester fragment. The diacylglycerols produced remain in the oil and provide a bonus oil yield that is retained throughout the refining process.

Dijkstra ("Enzymatic degumming", Eur. J. Lipid Sci. Technol. 2010, 112, 1178-1189) is a review article that provides an overview of different industrial enzymatic degumming processes.

U.S. Pat. No. 5,264,367 describes a method for reducing the content of phosphorus-containing components in an edible oil from which mucilage has previously been removed and which has a phosphorus content from 50 to 250 parts per million, which method comprises contacting said oil at a pH from 4 to 6 with an aqueous solution of a phospholipase A1, phospholipase A2, or phospholipase B which is emulsified in the oil until the phosphorus content of the oil is reduced to less than 5 parts per million, and then separating the aqueous phase from the treated oil. Enzymatic action can be enhanced by the addition of an organic carboxylic acid, which may be added before or after, and preferably during, the enzyme treatment. Citric acid is preferred.

EP-A 2 053 118 describes a method for removing phosphatide from crude oil obtained from a plant or animal source, the method comprising:

providing crude oil containing nonhydratable phosphatide, treating the crude oil with immobilized phospholipase, free of emulsification, to effect conversion of the nonhydratable phosphatide to hydratable phosphatide, mixing the treated crude oil with pure water or an aqueous solution, free of emulsification, to form a mixture having an oil phase and an aqueous phase, allowing separation of the oil phase and the aqueous phase, and collecting the oil phase.

Example 2 of the European patent applications describes extraction of the enzyme treated oil with aqueous solutions of EDTA, NTA, DTPA, ADA, lactic acid, citric acid and fumaric acid.

U.S. Pat. No. 4,049,686 describes a process for removing phosphatides from triglyceride oils which are substantially liquid at 40° C. comprising the steps of dispersing an acid or acid anhydride in the oil, said acid or acid anhydride having a pH of from 0.5 to 7 as measured at 20° C. in a one molar aqueous solution and said oil at a temperature of from 20 to 100° C., adjusting the temperature of the mixture to the range of from the lowest temperature at which the oil remains a liquid to 40° C., dispersing from 0.2 to 5 percent by weight of water in the mixture; maintaining the temperature of the mixture of oil, acid and water from 5 minutes to several days; and, thereafter separating an aqueous sludge containing the phosphatides from the oil. Preferred edible acids are acetic acid, citric acid, tartaric acid, lactic acid etc.

SUMMARY OF THE INVENTION

The inventors have developed an enzymatic degumming process that is extremely effective in removing phospholipids, including non-hydratable phospholipids (NHP), from unrefined vegetable oils. More particularly, the inventors have discovered that the effectiveness of enzymatic degumming processes can be improved significantly if the unrefined oil is mixed with water and lactic acid prior to or simultaneously with the enzymatic treatment.

Thus, the present invention provides a process for the enzymatic degumming of unrefined triglyceride oils, said process comprising:

a) providing an unrefined triglyceride oil having a phosphorus content of at least 100 mg per kg of unrefined triglyceride oil;

b) combining the unrefined triglyceride oil with water, lactic acid and enzyme to produce an oil-and-water emulsion, said enzyme being selected from phospholipase, lipid acyltransferase and combinations thereof;

c) keeping the emulsion at a temperature of 20-90° C. for at least 10 minutes; and d) separating degummed triglyceride oil from the emulsion.

Although the inventors do not wish to be bound by theory, it is believed that the addition of lactic acid in the present process enhances enzymatic hydrolysis of phospholipids and binds $Ca^{2+}$ and $Mg^{2+}$ by complexation. Surprisingly, it was found that in this respect lactic acid is more effective than both citric acid and phosphoric acid, even though the pKa of lactic acid (pKa=3.86) is significantly higher than the pKa of citric acid (pKa$_1$=3.13) and the pKa of phosphoric acid (pKa$_1$=2.148).

The present process further offers the advantage that, when operated on an industrial scale, essentially no equipment fouling is observed due to the fact that the lactate salts formed in the process—especially calcium lactate and magnesium lactate—are sufficiently water-soluble.

DETAILED DESCRIPTION OF THE INVENTION

Accordingly, a first aspect of the invention relates to a process for the enzymatic degumming of unrefined triglyceride oil, said process comprising:

a) providing an unrefined triglyceride oil having a phosphorus content of at least 100 mg per kg of unrefined triglyceride oil;

b) combining the unrefined triglyceride oil with water, lactic acid and enzyme to produce an oil-and-water emulsion, said enzyme being selected from phospholipase, lipid acyltransferase and combinations thereof;

c) keeping the emulsion at a temperature of 20-90° C. for at least 10 minutes; and d) separating degummed triglyceride oil from the emulsion.

The term "oil" as used herein refers to a lipid material that can be liquid, solid or semi-solid at ambient temperature (20° C.). The terms "oil" and "fat" are used interchangeably.

The term "triglyceride oil" as used herein refers to an oil containing at least 75 wt. % triglycerides.

The term "unrefined triglyceride oil" as used herein refers to a triglyceride oil that has a phosphorus content of at least 100 mg per kg. Crude triglycerides oils that have been extracted from a natural source are an example of unrefined triglyceride oils. Another example of unrefined triglyceride oils are partially degummed triglyceride oils. Partially degummed triglyceride oils may be produced by water-degumming of crude triglyceride oils.

The "phosphorus content" as referred to herein is measured by:

ISO 10540-3:2002 (Animal and vegetable fats and oils—Determination of phosphorus content—Part 3: Method using inductively coupled plasma (ICP) optical emission spectroscopy 90.93 ISO/TC 34/SC 11)

The term "phospholipase" as used herein refers to enzyme that hydrolyze phospholipids into fatty acids and other lipophilic substances. There are four major classes, termed A, B, C and D, distinguished by the type of reaction which they catalyze:

Phospholipase A

Phospholipase A1—cleaves the SN-1 acyl chain

Phospholipase A2—cleaves the SN-2 acyl chain

Phospholipase B—cleaves both SN-1 and SN-2 acyl chains

Phospholipase C—cleaves before the phosphate, releasing diacylglycerol and a phosphate-containing head group.

Phospholipase D—cleaves after the phosphate, releasing phosphatidic acid and an alcohol.

The term "lipid acyltransferase" refers to an enzyme which as well as having phospholipase activity also has acyltransferase activity, whereby the enzyme is capable of transferring an acyl group from a phospholipid to one or more acceptor substrates, such as one or more of the following: a sterol; a stanol; a carbohydrate; a protein; a protein subunit; glycerol.

The term "lactic acid" as used herein, unless indicated otherwise, refers to lactic acid (2-Hydroxypropanoic acid) as well as alkali metal salts of lactic acid.

The unrefined triglyceride oil that is degummed in the present process preferably has a phosphorus content of at least 150 mg per kg of unrefined triglyceride oil, more preferably of at least 200 mg per kg of unrefined triglyceride oil and most preferably of at least 300 mg per kg of unrefined triglyceride oil. Typically, the phosphorus content of the unrefined triglyceride oil does not exceed 2,000 mg per kg of unrefined triglyceride oil.

The calcium content of the unrefined triglyceride oil preferably is at least 10 mg per kg unrefined triglyceride oil, more preferably at least 30 mg per kg of unrefined triglyceride oil. Typically, the unrefined triglyceride oil contains not more than 200 mg, preferably not more than 150 mg calcium per kg of unrefined triglyceride oil.

The magnesium content of the unrefined triglyceride oil preferably is at least 10 mg per kg of unrefined triglyceride oil, more preferably at least 30 mg per kg of unrefined triglyceride oil. Typically, the unrefined triglyceride oil contains not more than 200 mg, more preferably not more than 150 mg magnesium per kg of unrefined triglyceride oil.

Besides triglycerides and phospholipids, the unrefined triglyceride oil typically contains other lipid component such as diglycerides, monoglycerides, free fatty acids, tocopherols, tocotrienols etc. The unrefined triglyceride oil preferably contains at least 80 wt. %, more preferably at least 85 wt. % triglycerides.

The unrefined triglyceride oil that is degummed in the present process preferably is an unrefined vegetable oil. Examples of unrefined vegetable oils that can suitably be degummed by the present process include unrefined soybean oil, unrefined rapeseed oil, unrefined sunflower oil, unrefined corn oil, unrefined cottonseed oil, unrefined palm oil, unrefined rice bran oil, unrefined arachis oil and combinations thereof. More preferably, the unrefined vegetable oil is selected from unrefined soybean oil, unrefined rapeseed oil, unrefined sunflower oil, unrefined corn oil, unrefined cottonseed oil, unrefined arachis oil and combinations thereof.

The unrefined triglyceride oil that is used in the present process is preferably produced by solvent extraction, more preferably by extracting crushed seed or crushed fruit with n-hexane.

In step b) of the present process the unrefined triglyceride oil may be combined with water, lactic acid and enzyme in successive stages. For instance, water may be introduced during a water degumming step which is followed by other process steps in which lactic acid and enzyme (and little or no water) are added.

In step b) water is preferably combined with the unrefined triglyceride oil in a total amount of 5-100 ml water per kg or unrefined triglyceride oil, more preferably of 10-70 ml water per kg or unrefined triglyceride oil and most preferably of 15-60 ml water per kg or unrefined triglyceride oil. The total amount of water that is introduced in step b) includes water that is introduced together with lactic acid and/or the enzyme.

In accordance with a preferred embodiment of the present process lactic acid is combined with the unrefined triglyceride oil in a total amount of 100-3,000 mg per kg of unrefined triglyceride oil, more preferably in a total amount of 200-2,000 mg per kg of unrefined triglyceride oil and most preferably in a total amount of 350-1,500 mg per kg of unrefined triglyceride oil.

According to a preferred embodiment, the step b) lactic acid is introduced in the form of the protonated acid, i.e. not as a salt. Accordingly, in a preferred embodiment, step b) comprises combining protonated lactic acid with the unrefined triglyceride oil in a total amount of at least 100 mg per kg of unrefined triglyceride oil, more preferably in a total amount of at least 200 mg per kg of unrefined triglyceride oil and most preferably in a total amount of at least 350 mg per kg of unrefined triglyceride oil.

The enzyme employed in step b) of the present process preferably is a phospholipase. More preferably, the enzyme is a phospholipase selected from the group of phospholipase A1, phospholipase A2, phospholipase B, phospholipase C and combinations thereof. Even more preferably, the enzyme is selected from phospholipase A1, phospholipase A2 and combinations thereof. Most preferably, the phospholipase is phospholipase A1. Quara® LowP is an example of a commercially available phospholipase A1 that can advantageously be employed in the present process.

In the present process, the enzyme is typically combined with the unrefined triglyceride oil in the form of an enzyme product that contains pure enzyme and carrier material. Typically, this enzyme product is combined with the unrefined triglyceride oil in a dose of 10-300 mg enzyme per kg of oil. More preferably, the enzyme product is applied in a dose of 20-200 mg enzyme per kg of oil and most preferably in a dose of 30-150 mg enzyme per kg of oil.

The water-and-oil emulsion that is produced in step b) of the present process preferably is water-in-oil emulsion. Even more preferably, the emulsion is a water-in-oil emulsion comprising a dispersed aqueous phase having volume weighted mean diameter of less than 100 microns, more preferably of 5-30 microns. The volume weighted mean diameter of the dispersed phase can suitably be determined by means of laser diffraction.

The production of the water-and-oil emulsion in step b) preferably comprises emulsification in a mixer, preferably a medium or high shear mixer.

The water-and-oil emulsion that is produced in step b) typically contains 0.5-10 wt. %, more preferably 1-7 wt. % and most preferably 1.5-6 wt. % water.

The aqueous phase of the water-and-oil emulsion typically has a pH in the range of 2 to 6.5.

In a particularly preferred embodiment of the present invention the unrefined triglyceride oil is combined with the lactic acid some time before addition of the enzyme. By allowing the lactic acid to interact with the non-hydratable phospholipids in the unrefined triglyceride oil these phospholipids are rendered more susceptible for enzymatic hydrolysis. Accordingly, in a particularly preferred embodiment, step b) of the present process comprises the successive steps of:

b1) mixing the unrefined triglyceride oil with an aqueous lactic acid solution;

b2) keeping the mixture at a temperature of 20-90° C. for at least 5 minutes; and b3) combining the mixture with an aqueous solution of the enzyme to prepare the oil-and-water emulsion.

The lactic acid solution that is mixed with the triglyceride oil in step b1) preferably contains 10-99 wt. %, more preferably 50-95 wt. % and most preferably 60-90 wt. % lactic acid.

Step b2) preferably comprises keeping the mixture at a temperature of 35-95° C. for at least 5 minutes, more preferably at a temperature of 45-90° C. for at least 5 minutes, most preferably at a temperature of 45-85° C. for at least 10 minutes. Preferably, the mixture is stirred while being kept at elevated temperature in step b2).

According to one preferred embodiment, the enzyme employed in the present process has maximum activity at a pH in the range of 2.5-4.0. Examples of phospholipase that have maximum activity within this acid pH range are Quara® LowP and Rohalase PL-Xtra®. Most preferably, the enzyme employed in accordance with this embodiment is a phospholipase A1.

In the embodiment in which the process employs an enzyme having maximum activity at a pH in the range of 2.5-4.0. The aqueous phase of the water-and-oil emulsion preferably has a pH in the range of 2.5 to 5, more preferably in the range of 2.8 to 4.5 and most preferably of 3.0 to 4.2.

According to an alternative embodiment, the enzyme has a maximum activity at a pH in the range of 4.2-6.5 and in step b) the unrefined triglyceride oil is additionally combined with a carbonate to produce the oil-and-water emulsion, said carbonate being selected from sodium carbonate ($Na_2CO_3$), potassium carbonate ($K_2CO_3$), sodium bicarbonate ($NaHCO_3$), potassium bicarbonate ($KHCO_3$) and combinations thereof. More preferably, the carbonate is selected from sodium carbonate, potassium carbonate and combinations thereof.

According to a particularly preferred embodiment, the enzyme employed in accordance with this alternative embodiment is a phospholipase A1.

Examples of phospholipases that have maximum activity in the pH range of 4.2 to 6.5 are Lecitase® Ultra and Lysoma.x®.

The inventors have discovered that the combined use of lactic acid and carbonate to set a pH in the range of 4.5-7.0 offers the advantage that less soap is formed before the separation step than in case a strong base such as sodium hydroxide is used. Also, no insoluble salts are formed (in contrast to when citric acid is used). Thus, separation of the degummed oil from the enzymolysed emulsion can be achieved without difficulty.

In the embodiment in which the process employs an enzyme having maximum activity at a pH in the range of 4.2-6.5, the aqueous phase of the water-and-oil emulsion preferably has a pH in the range of 4.5 to 7.0, more preferably in the range of 4.8 to 6.5 and most preferably of 5.0 to 6.0.

In the embodiment in which the enzyme has maximum activity at a pH in the range of 4.2 to 6.5, step b) of the process preferably comprises the successive steps of:

b1) mixing the unrefined triglyceride oil with an aqueous lactic acid solution having a pH of less than 4.5, more preferable of less than 4.3, most preferably of less than 4.0;

b2) keeping the mixture at a temperature of 20-90° C. for at least 5 minutes;

b3) combining the mixture with (a) an aqueous carbonate solution to increase the pH to at least 4.5, more preferably of at least 5.0 and (b) an aqueous solution of the enzyme to prepare the oil-and-water emulsion.

The combining of the mixture with the aqueous carbonate solution typically increases the pH of the mixture with at least 0.5 pH points, more preferably with at least 0.8 pH point and most preferably with 0.9 to 2 pH points.

The carbonate solution that is employed in according with this embodiment of the process preferably contains at least 0.045 mol/L, more preferably 0.18-4.7 mol/L and most preferably 1-3 mol/L carbonate.

Step c) of the degumming process of the present invention preferably comprises keeping the emulsion at temperature of 35-85° C. for at least 10 minutes, preferably for at least 15 minutes. More preferably, step c) comprises keeping the emulsion at temperature of 40-80° C. for at least 10 minutes, more preferably for at least 15 minutes and most preferably for 30-360 minutes. Preferably, the emulsion is stirred while being kept at elevated temperature in step c).

In the present process the degummed oil is separated from the emulsion in step d). This separation typically comprises separation of the oil phase and the aqueous phase of the emulsion. The aqueous phase contains phospholipids and hydratable phospholipid breakdown products that were produced in step c) by removing the aqueous phase a degummed oil is obtained having a reduced phospholipid content.

The degummed triglyceride oil can be separated from the emulsion using separation techniques known in the art, such as centrifugation, decantation etc. Preferably, the degummed triglyceride oil is separated from the emulsion by means of centrifugation.

Typically, the phosphorus content of the degummed triglyceride oil (in mg per kg) that is obtained in the present process is less than 30%, more preferably less than 20% of the phosphorus content of the unrefined triglyceride oil (in mg per kg).

The calcium content of the degummed triglyceride oil (in mg per kg) is typically less than 40%, more preferably less than 30% of the calcium content of the unrefined triglyceride oil (in mg per kg).

The magnesium content of the degummed triglyceride oil (in mg per kg) is typically less than 40%, more preferably less than 30% of the magnesium content of the unrefined triglyceride oil (in mg per kg).

The degummed triglyceride oil that is obtained by the present process preferably has a phosphorus content of less than 150 mg per kg of degummed triglyceride oil. More preferably, the degummed triglyceride oil has a phosphorus content of less than 100 mg per kg of degummed triglyceride oil, even more preferably of less than 50 mg per kg of degummed triglyceride oil. Most preferably, the degummed triglyceride oil has a phosphorus content of less than 20 mg per kg of degummed triglyceride oil.

The degummed triglyceride oil that is obtained by the present process preferably has a calcium content of less than 50 mg per kg of degummed triglyceride oil. More preferably, the degummed triglyceride oil has a calcium content of less than 20 mg per kg of degummed triglyceride oil, even more preferably of less than 10 mg per kg of degummed triglyceride oil. Most preferably, the degummed triglyceride oil has a calcium content of less than 5 mg per kg of degummed triglyceride oil.

The degummed triglyceride oil that is obtained by the present process preferably has a magnesium content of less than 50 mg per kg of degummed triglyceride oil. More preferably, the degummed triglyceride oil has a magnesium content of less than 15 mg per kg of degummed triglyceride oil, even more preferably of less than 7 mg per kg of degummed triglyceride oil. Most preferably, the degummed triglyceride oil has a magnesium content of less than 3 mg per kg of degummed triglyceride oil.

The degummed triglyceride oil that is obtained in the present process may suitably be further processed to produce a refined triglyceride oil. Examples of further processing steps that may be employed include neutralization, bleaching and deodorization. Preferably, the degummed oil is further processed to produce a refined triglyceride oil, said further processing comprising deodorization of the triglyceride oil. Most preferably the further processing comprises bleaching of the degummed triglyceride oil followed by deodorization of the bleached triglyceride oil.

The refined triglyceride oil that is obtained by a process that comprises the aforementioned additional processing preferably has a free fatty acid content of less than 0.25%, more preferably of less than 0.05%.

Another aspect of the invention relates to a triglyceride oil that is obtained by a process as defined herein.

The invention is further illustrated by the following non-limiting examples.

EXAMPLES

Example 1

Crude soybean oils were degummed using different acids (lactic acid, citric acid or phosphoric acid) in combination with phospholipase (Quara® LowP, ex Novozymes). The following degumming procedure was used:

80 grams of crude soybean oil was homogenized and heated to 70° C.;

Acid was added in an amount equivalent to 1,000 mg (dry) acid per kg of oil or 1,200 mg (dry) acid per kg of oil. Citric acid was added in the form of a 50% (w/w) aqueous solution. Phosphoric acid and lactic acid were added in the form of a 85% (w/w) aqueous solution;

The combination of crude oil and aqueous acid solution was mixed in high shear mixer for 15 seconds to produce an emulsion;

The emulsion was kept at 70° C. for 40 minutes under stirring;

Next, a solution containing 2.4 grams of water, and 48 mg of Quara® LowP was added to the hot oil;

The mixture was submitted to high shear mixing for 60 seconds, and kept for 180 min under constant stirring and constant temperature of 70° C.

Next, the emulsion was heated to 80° C. and the aqueous phase was separated from the degummed oil phase.

Before and after degumming the soybean oil was analysed to determine phosphor content and the concentration of calcium, magnesium. The results are shown in Tables 1, 2 and 3.

TABLE 1

|  | P (mg/kg) | Ca (mg/kg) | Mg (mg/kg) |
| --- | --- | --- | --- |
| Crude oil | 630 | 63 | 66 |
| Degummed using citric acid - 1000 ppm | 19.5 | 2.27 | 2.14 |
| Degummed using phosphoric acid - 800 ppm | 22.4 | 2.01 | 1.7 |
| Degummed using lactic acid - 1000 ppm | 7.8 | 0.98 | 0.82 |

TABLE 2

|  | P (mg/kg) | Ca (mg/kg) | Mg (mg/kg) |
| --- | --- | --- | --- |
| Crude oil | 1116 | 115 | 130 |
| Degummed using citric acid - 1200 ppm | 24.8 | 0.99 | 2.06 |
| Degummed using lactic acid - 1200 ppm | 18.6 | 1.65 | 1.55 |

TABLE 3

|  | P (mg/kg) | Ca (mg/kg) | Mg (mg/kg) |
| --- | --- | --- | --- |
| Crude oil | 684 | 71 | 83 |
| Degummed using citric acid -1000 ppm | 37 | 3.7 | 3.23 |
| Degummed using phosphoric acid -1000 ppm | 40 | 4.46 | 3.10 |
| Degummed using lactic acid -1000 ppm | 13.8 | 1.95 | 1.67 |

Example 2

Crude soybean oil was degummed using lactic acid (700 ppm or 1000 ppm) in combination with phospholipase A1 (Lecitase®, ex Novozymes). The effect of the addition of different amounts sodium hydroxide and sodium carbonate ($Na_2CO_3$) was tested.

The degumming procedure used was the same as in Example 1, except that after having kept the emulsion at 70° C. for 40 minutes, the emulsion was cooled to 55°. Next, sodium hydroxide was added in the form of a 50% (w/w) aqueous solution or sodium carbonate was added in the form of a 20% (w/w) aqueous solution, followed by addition of the enzyme solution. After high shear mixing, the emulsion was kept at 55° C. for 180 minutes.

The results of these tests are summarized in Table 4 (700 ppm lactic acid) and Table 5 (1000 ppm lactic acid).

TABLE 4

| 700 ppm lactic acid | pH | Soap (mg/kg) | P (mg/kg) | Ca (mg/kg) | Mg (mg/kg) |
| --- | --- | --- | --- | --- | --- |
| Crude oil |  |  | 111 | 46 | 23 |
| Degummed using 120 ppm NaOH | 4.9 | 263 | 17 | 8.4 | 1.9 |
| Degummed using 200 ppm NaOH | 5.8 | 410 | 20 | 16 | 3.3 |
| Degummed using 260 ppm NaOH | 6.9 | 473 | 32 | 26 | 6.8 |
| Degummed using 200 ppm $Na_2CO_3$ | 5.5 | 215 | 8.5 | 7.1 | 1.2 |
| Degummed using 250 ppm $Na_2CO_3$ | 5.9 | 106 | 8.8 | 7.0 | 1.5 |

TABLE 5

| 1,000 ppm lactic acid | pH | Soap (mg/kg) | P (mg/kg) | Ca (mg/kg) | Mg (mg/kg) |
| --- | --- | --- | --- | --- | --- |
| Crude oil |  |  | 111 | 46 | 23 |
| Degummed using 200 ppm NaOH | 4.8 | 510 | 22 | 7.7 | 2.5 |
| Degummed using 350 ppm NaOH | 5.9 | 558 | 20 | 16 | 2.9 |
| Degummed using 200 ppm $Na_2CO_3$ | 4.9 | 275 | 9.1 | 2.6 | 0.8 |
| Degummed using 350 ppm $Na_2CO_3$ | 5.7 | 288 | 5.4 | 4.4 | 0.8 |

The invention claimed is:

1. A process for enzymatic degumming of crude triglyceride oil, the process comprising:
   (a) providing an unrefined triglyceride oil having a phosphorus content of at least 100 mg per kg of unrefined triglyceride oil;
   (b) combining the unrefined triglyceride oil with water, lactic acid and enzyme to produce an oil-and-water emulsion, the enzyme being selected from phospholipase, lipid acyltransferase and combinations thereof;
   (c) keeping the emulsion at a temperature of 20-90° C. for at least 10 minutes; and
   (d) separating degummed triglyceride oil from the emulsion.

2. The process according to claim 1, wherein the enzyme is phospholipase.

3. The process according to claim 2, wherein the phospholipase is phospholipase A1.

4. The process according to claim 1, wherein (b) comprises successively:
   (b1) mixing the unrefined triglyceride oil with an aqueous lactic acid solution;
   (b2) keeping the mixture at a temperature of 20-90° C. for at least 5 minutes; and
   (b3) combining the mixture with an aqueous solution of the enzyme to prepare the oil-and-water emulsion.

5. The process according to claim 1, wherein the enzyme has maximum activity at a pH range of 2.5-4.0.

6. The process according to claim 1, wherein the enzyme has a maximum activity at a pH range of 4.2-6.5 and wherein in (b) the unrefined triglyceride oil is further combined with a carbonate to produce the oil-and-water emulsion.

7. The process according to claim 6, wherein the carbonate is selected from sodium carbonate, potassium carbonate, sodium bicarbonate, potassium bicarbonate and combinations thereof.

8. The process according to claim 6, wherein (b) comprises successively:
- (b1) mixing the unrefined triglyceride oil with an aqueous lactic acid solution having a pH of less than 4.5;
- (b2) keeping the mixture at a temperature of 20-90° C. for at least 5 minutes; and
- (b3) combining the mixture with (a) an aqueous carbonate solution to increase the pH to at least 4.5 and (b) an aqueous solution of the enzyme to prepare the oil-and-water emulsion.

9. The process according to claim 1, wherein the enzyme is combined with the unrefined triglyceride oil in the form of an enzyme product that contains pure enzyme and carrier material.

10. The process according to claim 9, wherein the enzyme product is combined with the unrefined triglyceride oil in a dose of 10-300 mg enzyme per kg of oil.

11. The process according to claim 1, wherein lactic acid is combined with the unrefined triglyceride oil in a total amount of 100-3,000 mg per kg of unrefined triglyceride oil.

12. The process according to claim 1, wherein water is combined with the unrefined triglyceride oil in a total amount of 5-100 ml water per kg or unrefined triglyceride oil.

13. The process according to claim 1, wherein the unrefined triglyceride oil is selected from unrefined soybean oil, unrefined rapeseed oil, unrefined sunflower oil, unrefined corn oil, unrefined cottonseed oil, unrefined palm oil, unrefined rice bran oil, unrefined *arachis* oil and combinations thereof.

14. The process according to claim 1, wherein (c) comprises keeping the emulsion at temperature of 35-85° C. for at least 10 minutes.

15. The process according claim 1, wherein the degummed triglyceride oil is separated from the emulsion by centrifugation.

16. The process according to claim 1, wherein the degummed triglyceride oil has a phosphorus content of less than 150 mg per kg of unrefined triglyceride oil.

* * * * *